UNITED STATES PATENT OFFICE.

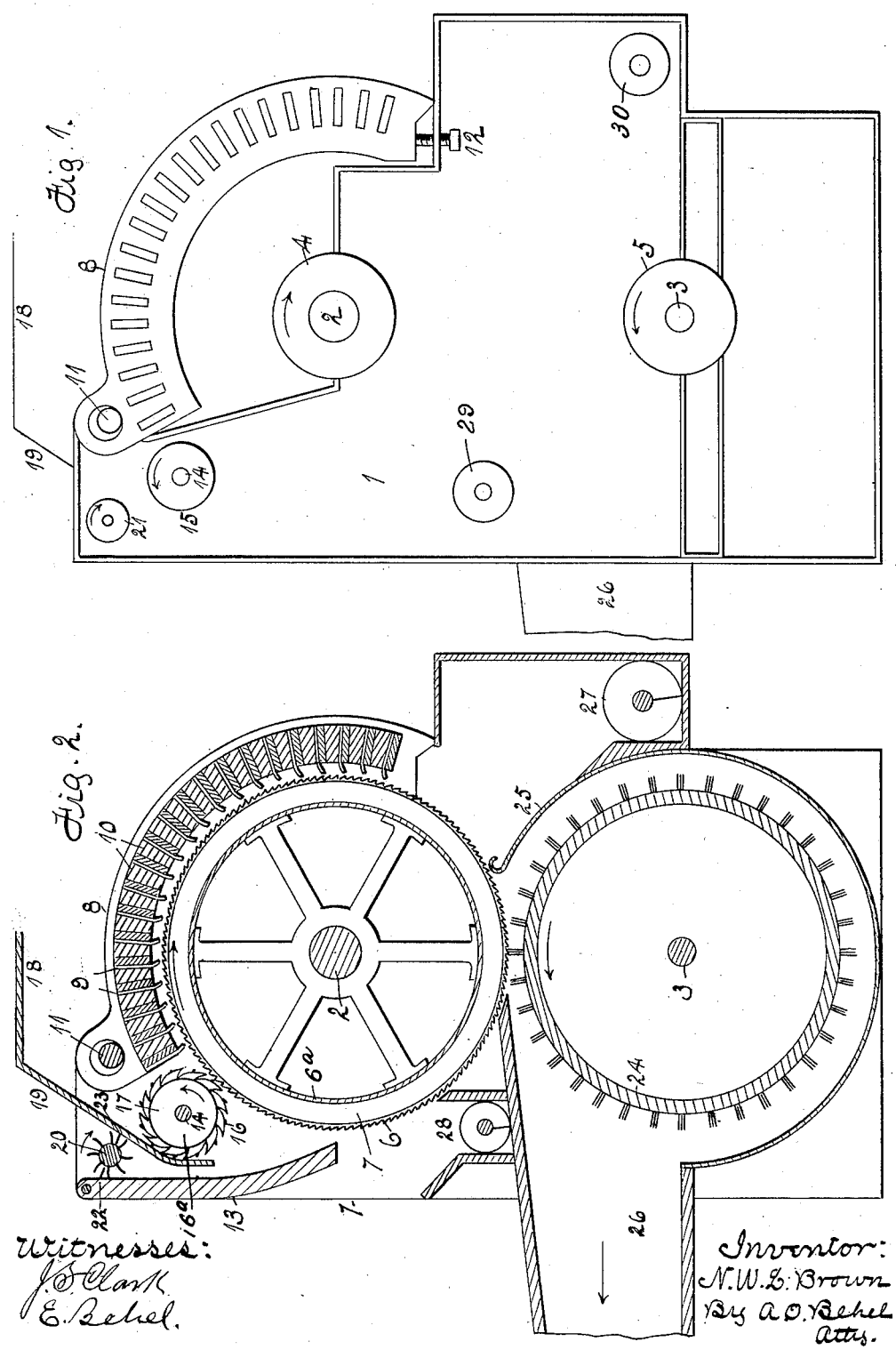

NIMROD W. L. BROWN, OF THOMASVILLE, ALABAMA.

HULLER COTTON-GIN.

1,043,800.  Specification of Letters Patent.  Patented Nov. 12, 1912.

Application filed June 4, 1908. Serial No. 436,627.

*To all whom it may concern:*

Be it known that I, NIMROD W. L. BROWN, a citizen of the United States, residing at Thomasville, in the county of Clarke and State of Alabama, have invented certain new and useful Improvements in Huller Cotton-Gins, of which the following is a specification.

This invention relates to cotton gins, and the following are some of the more important advantages and improvements it is claimed to embody in comparison with the present ordinary cotton gins, to-wit: This invention dispenses with the roll box and stationary ribs as used in the present ordinary cotton gins. The materials being ginned are passed through my new machine somewhat in the form of a sheet, instead of being confined in the form of a cylinder, as in the present ordinary gin. My new machine removes the fibers more closely and more evenly, and with less breakage than the present ordinary gin, and provides a novel and effective means for the removal of the motes and trash from the lint cotton. Briefly stated, I accomplish these improvements by providing in combination with a gin saw, or saw cylinder, an obstructing breast of two distinct parts, namely; a stationary member, and a rotating member, the cotton being first subjected to the conjoint action of the saw cylinder, and the rotating obstructing cylinder, and then to the action of the saw cylinder and the stationary breast member.

I have illustrated in the accompanying drawings, one embodiment of my invention, and in said drawings—Figure 1 is a side view of a gin embodying my invention. Fig. 2 is a vertical sectional view of the gin shown in Fig. 1.

Referring to the drawings by numerals, like numbers indicating like parts in the several views, 1 denotes the housing or casing of the gin, in which is mounted a saw cylinder 6ª having a supporting shaft 2, provided with a driving pulley 4, this shaft carrying a spider and drum upon which is mounted a series of saws 6, preferably formed of thin steel rings, separated by spacing rings 7, which reach nearly to the bases of the saw teeth, as will be clear from Fig. 2. Below the saw cylinder is mounted the brush for removing the lint cotton from the saw teeth, said brush carried by a suitable shaft 3, on which is mounted a driving pulley 5, as shown in Figs. 1 and 2.

The saw cylinder 6ª and the brush rotate in the directions shown by the arrows (Fig. 2), and the saw cylinder is embraced at its top and delivery side by the stationary breast which is made up of two end castings 8, in which are supported by means of radial slots (see Fig. 1) a series of obstructing blades 9, which are held separated by spacing blocks 10, said blades 9 being flexible, and preferably being formed of spring metal, so that their free edges may yield, and preferably these blades 9 are adjustable in the slots in the end castings 8. The entire breast, thus constructed, is adjustable by means of the eccentric shaft 11 at the upper end of the castings 8, and by means also of the set screws 12 at the bottom of the end castings 8.

On the feed side of the saw cylinder there is provided an apron 13 forming one wall of the feeding throat or inlet, the feeder-board 19 from the feeder 18, forming the opposite wall; an opener roll 20, driven by a pulley 21, and having teeth which coöperate with fixed teeth 22 and 23 on the walls of the throat, being provided, which opener receives the seed cotton fed into the throat, and delivers it to the passage below. The lower end of the apron 13 is curved inwardly toward the saw cylinder so as to direct the seed cotton coming from the roll 20 against the saws 6. The saws, hanging into the lint of the seed cotton, carry it, lock by lock, upward toward the coöperating ginning instrumentalities. At the same time, the saws are unable to carry upward any nonfibrous foreign materials which might by accident be mixed with the seed cotton, such as nails, pods, or pebbles, and such nonfibrous materials by gravity pass out from the bottom of the curved apron 13 to the conveyer 28 driven by the pulley 29 whence they are automatically removed.

Located at the forward end of the stationary breast just described is a rotary breast element 16ª, comprising a shaft 14, on which is mounted a series of circular saws, having rearwardly turned teeth 16, which point in a direction opposite the direction of the teeth on the saw cylinder. The rotating breast or obstructing cylinder 16ª, is closely arranged relative to the saw cylinder 6ª, although not touching the same, and as the seed cotton is carried upwardly by the saw cylinder, it is engaged and retarded by the rearwardly pointing teeth 16 of the cylinder 16ª, which teeth 16 do and must revolve at less speed than the teeth of the saws 6. While revolving said teeth 16 have an action somewhat similar to that of the stationary ribs in the ordinary gin. The cylinder 16ª may be revolved by any suitable means, such for instance as a pulley 15 fast on the shaft 14.

The seed cotton, in passing between the saws 6 and the obstructing cylinder 16ª is ginned to a great extent, part of the lint being transferred directly to the teeth of the saws 6, and part of it being transferred directly to the teeth 16 of the obstructing cylinder. Since the teeth 16 point rearwardly, they do not carry their lint around, but drop it as they begin to leave the sheet of seed cotton being worked upon by the saw cylinder 6ª, and thus transfer their lint to the saws 6 also. The partly delinted seeds, in emerging from under the obstructing teeth 16, flow into the stationary breast, where they are obstructed by the blades 9, hereinbefore described, and subjected to further ginning action to the effect that the seeds are completely delinted by the time they reach the bottom of the stationary breast, whence they pass to the conveyer 27 driven by the pulley 30. The lint cotton, adhering to the saw teeth 6, is subjected to a cleaning and demoting action from gravity and centrifugal force, after it leaves the bottom of the stationary breast, and until it passes within the brush chamber wall 25. The lint is removed from the saw cylinder 6ª by the brush 24, and blown out in the ordinary way through the lint flue 26.

It will be understood that such variations in mechanical structure as are within the skill of the mechanic may be made without departing from the spirit of my invention.

I claim:

1. In a cotton gin, a ginning cylinder, a cotton retarding cylinder rotating in close relation to the surface of the ginning cylinder and at less speed, the contiguous sides of the two cylinders moving in the same direction, a feed throat through which cotton is delivered to the ginning cylinder and carried thereby to the retarding cylinder, and a closed breast partly surrounding said ginning cylinder for removing the lint from the seed.

2. In a cotton gin, a ginning cylinder, a cotton retarding cylinder having circular rows of rearwardly turned teeth, said retarding cylinder rotating in close relation to the surface of the ginning cylinder and at less speed, the contiguous sides of the two cylinders moving in the same direction, a feed throat through which cotton is delivered to the ginning cylinder and carried thereby to the retarding cylinder, and a closed breast partly surrounding said ginning cylinder and having a series of plates projecting toward said cylinder.

3. In a cotton gin, a ginning cylinder, a cotton retarding cylinder comprising a plurality of saws having rearwardly turned teeth rotating in close relation to the surface of the ginning cylinder and at less speed for holding the cotton to the face of the cylinder and permitting the passage of seed, the contiguous sides of the two cylinders moving in the same direction, and a breast partly surrounding said ginning cylinder in rear of said retarding cylinder and having a series of plates projecting radially toward the ginning cylinder.

4. A cotton gin having a ginning cylinder, a retarding cylinder having rearwardly turned teeth located adjacent the ginning cylinder, the contiguous sides of said cylinders moving in the same direction but at different speeds; a feed throat delivering to the ginning cylinder in advance of the point of contiguity of said ginning cylinder and said retarding cylinder, a toothed opening roll in said feed throat, and fixed projections on opposite walls of said throat to act in connection with said roll for separating cotton.

5. In a cotton gin, in combination, a ginning cylinder, a stationary obstructing breast embracing the upper portion of the ginning cylinder on the discharge side, means on each end of said obstructing breast for adjusting the same, and a rotating rearwardly turned toothed retarding cylinder contiguous to the ginning cylinder on the feed side of said ginning cylinder.

6. In a cotton gin, a ginning cylinder, a stationary obstructing breast partly embracing the discharge side of said ginning cylinder, means on each end of said breast for adjusting the same, spring blades projecting from the concave side of said obstructing breast toward the ginning cylinder, and a retarding cylinder having rearwardly turned teeth on the feed side of said ginning cylinder, the contiguous sides of said cylinders moving in the same direction.

7. In a cotton gin, in combination, a ginning cylinder; a retarding cylinder located adjacent to the ginning cylinder, the space between said ginning cylinder and said retarding cylinder being sufficient for the passage of cotton seed, said retarding cylinder having rearwardly turned teeth, and rotating in an opposite direction to and at less speed than said ginning cylinder; and a feed throat delivering to said ginning cylinder in advance of its point of contiguity with said retarding cylinder.

8. In a cotton gin, a ginning cylinder, a feed throat through which cotton is delivered direct to said cylinder, a swinging apron forming one wall of said throat and adapted to regulate the size of the throat, a rotating opening roll in said throat provided with outwardly projecting pins, fixed pins on opposite sides of said throat arranged to act in connection with the pins on said roll, a retarding cylinder rotating in an opposite direction and slower than the ginning cylinder, and a stationary obstructing breast.

9. In a cotton gin, in combination, a ginning cylinder, a retarding cylinder located adjacent to but slightly spaced from the ginning cylinder, a brush cylinder making contact with the ginning cylinder, said retarding cylinder having rearwardly turned teeth, and rotating in an opposite direction to, and at less speed than said ginning cylinder, and a feed throat for delivering cotton to the ginning cylinder below the retarding cylinder.

10. In a cotton gin, a ginning cylinder, a cotton retarding cylinder having rearwardly turned peripheral teeth, said retarding cylinder rotating in close relation to the surface of the ginning cylinder and at less speed for holding the cotton to the face of the cylinder and permitting the passage of seed, the contiguous sides of the two cylinders moving in the same direction; and a feed throat delivering to said ginning cylinder in advance of the point of contiguity of said ginning cylinder and said retarding cylinder.

In testimony whereof I have hereunto set my hand in presence of two subscribing witnesses.

NIMROD W. L. BROWN.

Witnesses:
W. H. Hall,
J. T. Sifford.

---

Copies of this patent may be obtained for five cents each, by addressing the "Commissioner of Patents, Washington, D. C."